June 28, 1938.   H. JANSSEN   2,122,144
STOCKING DISPLAY DEVICE AND THE LIKE
Filed April 14, 1936   5 Sheets-Sheet 1

INVENTOR:
Henry Janssen,
BY
ATTORNEY.

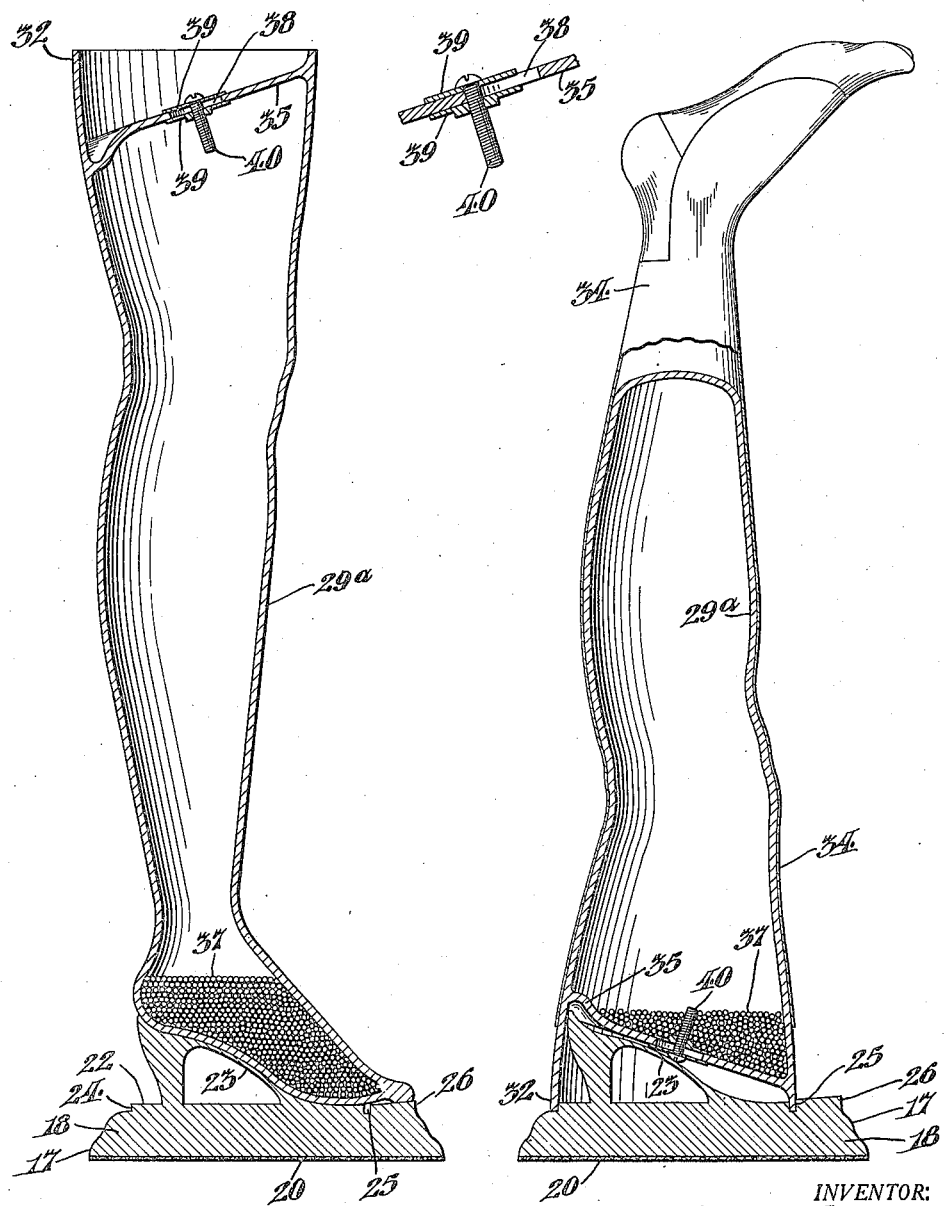

June 28, 1938. H. JANSSEN 2,122,144
STOCKING DISPLAY DEVICE AND THE LIKE
Filed April 14, 1936 5 Sheets-Sheet 3
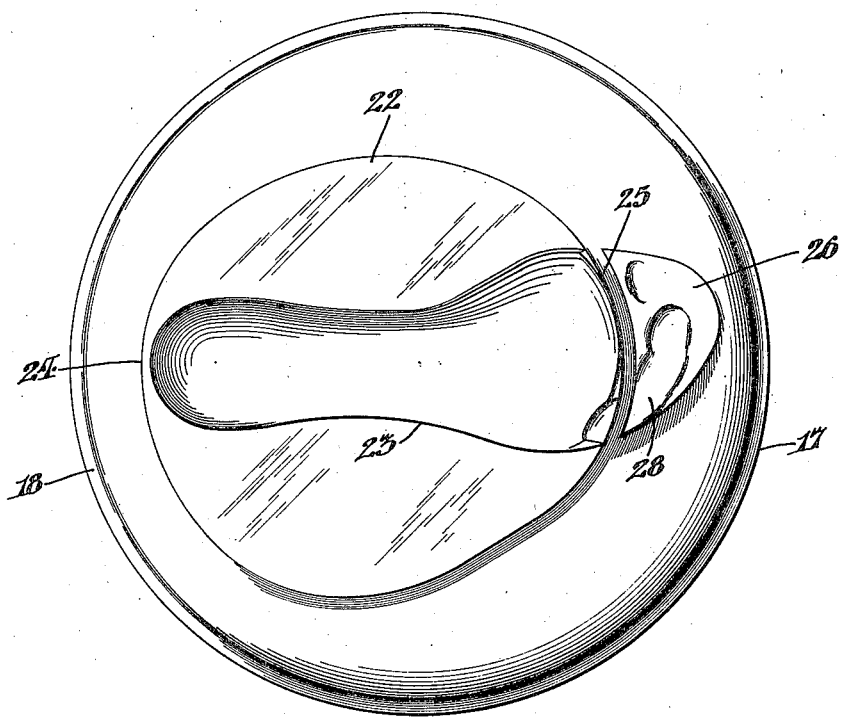
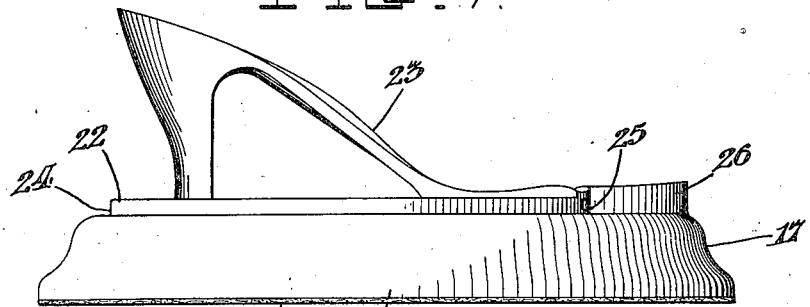
INVENTOR:
Henry Janssen,
BY
ATTORNEY.

June 28, 1938. H. JANSSEN 2,122,144
STOCKING DISPLAY DEVICE AND THE LIKE
Filed April 14, 1936 5 Sheets-Sheet 4
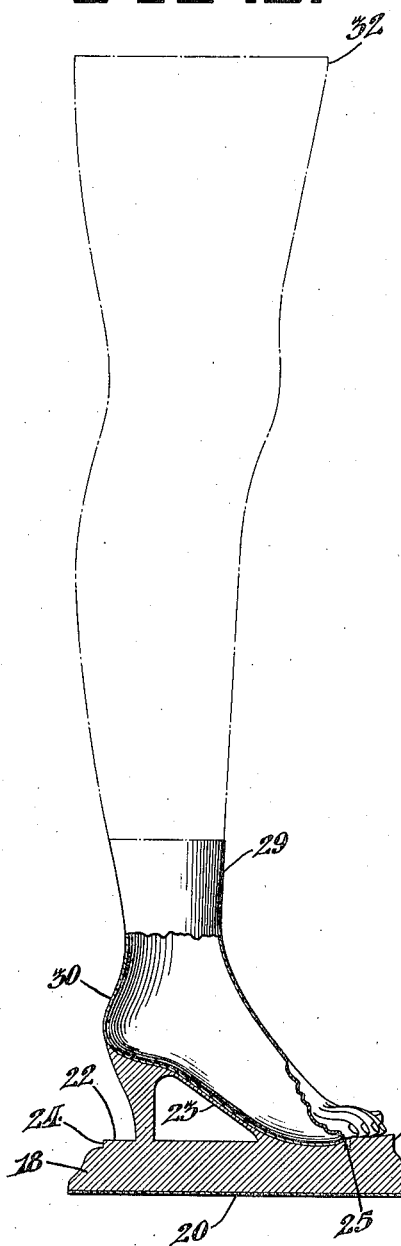
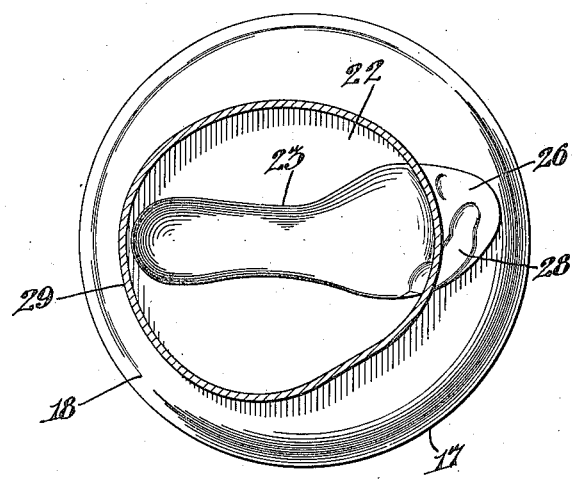
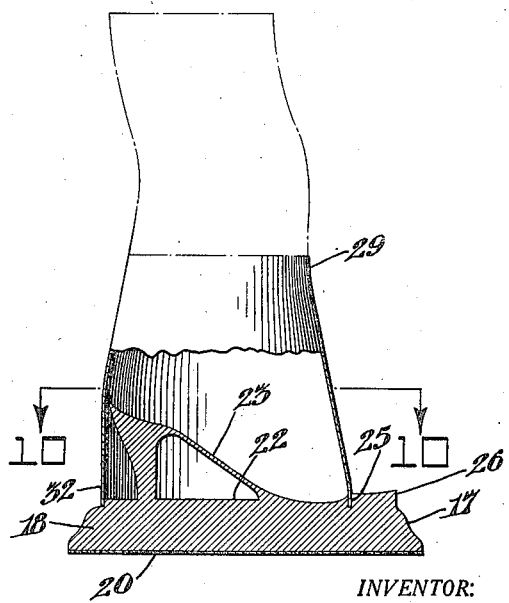
INVENTOR:
Henry Janssen,
BY
ATTORNEY.

June 28, 1938. H. JANSSEN 2,122,144
STOCKING DISPLAY DEVICE AND THE LIKE
Filed April 14, 1936 5 Sheets-Sheet 5
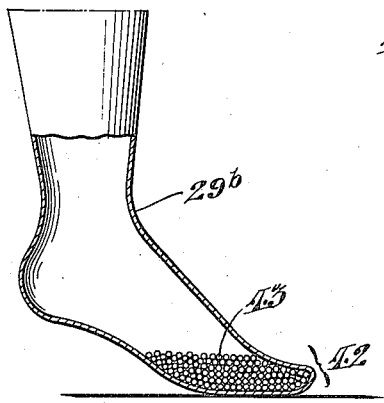
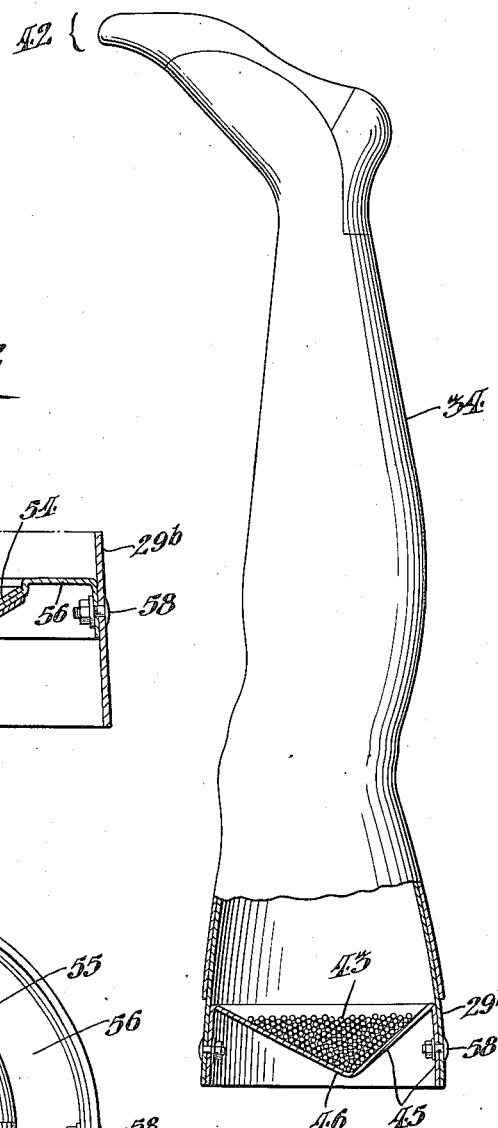
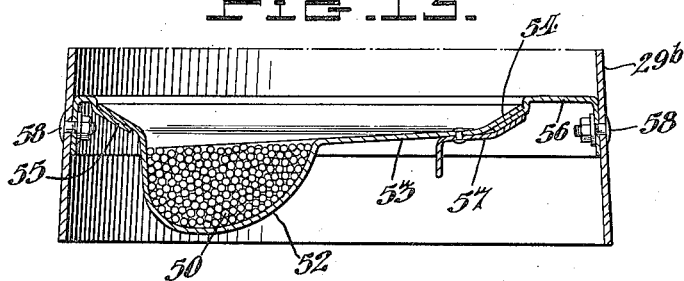
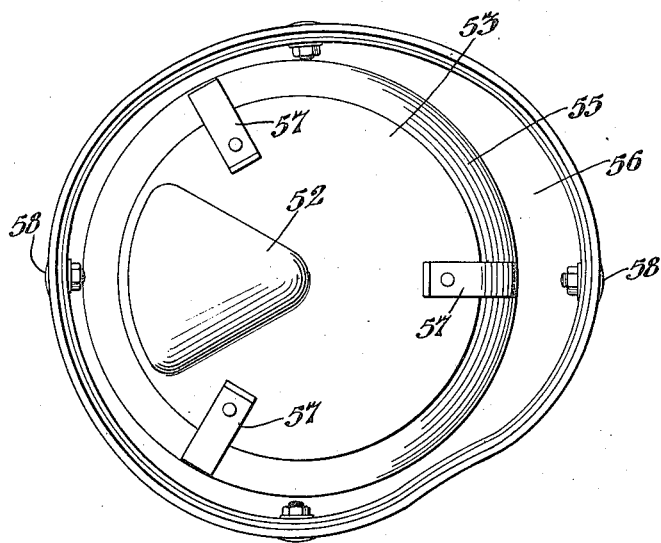
INVENTOR:
Henry Janssen,
BY
ATTORNEYS.

Patented June 28, 1938

2,122,144

UNITED STATES PATENT OFFICE 2,122,144

STOCKING DISPLAY DEVICE AND THE LIKE

Henry Janssen, Wyomissing, Pa., assignor to Textile Machine Works, Wyomissing, Pa., a corporation of Pennsylvania Application April 14, 1936, Serial No. 74,286

5 Claims. (Cl. 223—75)

My invention relates to hosiery-display devices and the like, and particularly to devices of this character for displaying ladies' stockings of the sheer silk type as they appear in service.

Devices, heretofore employed for displaying articles of hosiery on foot and leg forms, are of the flat, or silhouette form, and of the form simulating the natural shape of a normal human foot and leg.

The invention is exemplified in the latter form, but also has, in certain elements, features that may to advantage be employed not only in the flat form, but in a display or other device, and in supporting other articles of wearing apparel.

Hosiery forms are generally capable of support in only one upright position or the other, having the foot or leg end at the top. In other words, a form of this kind which is adapted for support at its foot end is not adapted for support at its leg end, and a form adapted for support at its leg end is not adapted for support at its foot end. An example of a prior structure of this type is a form of thin-walled or shell-like character having a balance weight mass disposed in fixed position in the toe, and the latter deformed on the bottom to adapt it to sit on a flat plane base.

It is an object of this invention to overcome disadvantages of other devices of its kind, whereby the article displayed will require less handling, will be less subject to injury, and may be more thoroughly and completely inspected.

It is another object to provide a hosiery or other wearing apparel display form, or other structure involving the equivalents of its features, which may be placed in selected positions and remain in the selected positions in stable equilibrium irrespective of its contour and of effects tending to render it of unstable equilibrium.

Another object is to provide a form of the above-indicated character, and a base therefor, or equivalently cooperating elements, in which such cooperating elements have complementary seats for placing the elements together in each of a plurality of positions.

Another object is to provide a base for a display form or like element on which the seats for the form are so arranged that the latter may be effectively seated in one of different positions in the same general location on the base.

A further object of the invention is to provide a device of the above-indicated character that shall be simple and durable in construction, economical to manufacture and effective in its operation.

With these and other objects in view, which will appear from the description of the examples of the invention shown in the accompanying drawings, the invention comprises the novel elements and combination of parts in cooperative relation, as hereinafter pointed out in the claims.

In the drawings:

Fig. 3 is a view in vertical-plane section, taken substantially along the line 3—3 of Fig. 2;

Fig. 4 is a view of the device of Fig. 3, with the leg-and-foot form in inverted upright position on the base, and partially similarly in section taken in a front-to-back vertical median plane having an upper portion in elevation supporting a portion of a stocking;

Fig. 5 is a detail view, on an enlarged scale of a portion of the device as shown near the top of Fig. 3;

Fig. 6 is a top-plan view on an enlarged scale of a base for the leg form shown in Figs. 8, 9 and 10;

Fig. 7 is a view, in side elevation, of the base of Fig. 6;

Fig. 8 is a view, on a reduced scale and in vertical-plane section, of the base, seen in the direction of Fig. 7, together with a hollow body constituting a foot-and-leg form for cooperative seating in normal upright position on the base, shown partially in section, partially in side elevation and partially in broken lines, and having parts broken away;

Fig. 9 is a view showing the base as in Fig. 8, with a portion of the form cooperatively seated in inverted upright position on the base and otherwise illustrated as in Fig. 8;

Fig. 10 is a view taken substantially along the line 10—10 of Fig. 9;

Fig. 11 is a view in longitudinal section of the lower portion of a leg-and-foot form embodying the invention in further modified form;

Fig. 12 is a view of the entire leg-and-foot form of Fig. 11, in inverted upright position;

Fig. 13 is a view in longitudinal section of a top portion of a leg form with such top portion disposed at the bottom of the form when the latter is in inverted upright position, and embodying the invention in further modified form; and Fig. 14 is a bottom plan view of the structure shown in Fig. 13.

Figure 1:
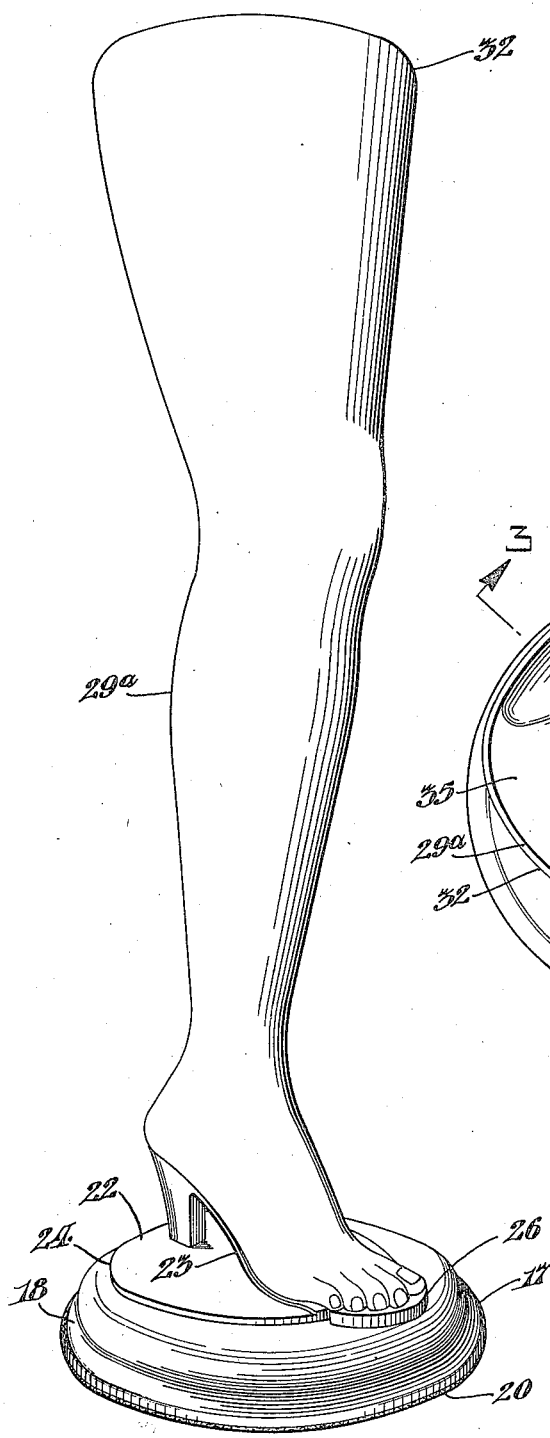
Figure 1 is a view in perspective of a display device embodying the invention.
Figure 2:
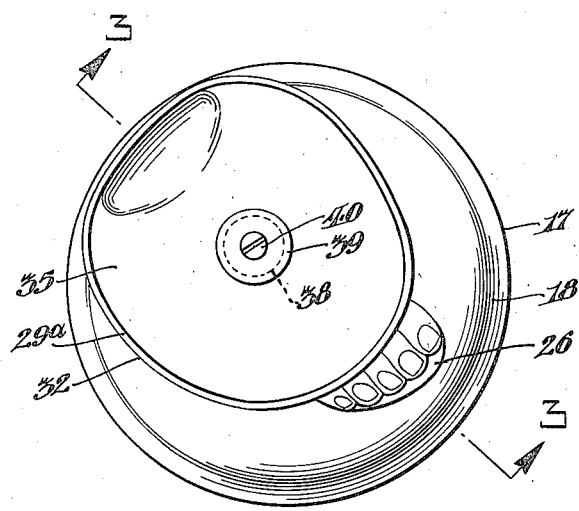
Fig. 2 is a top plan view of the device of Fig. 1.

Referring to Fig. 6, a base 17 having a lower or main body portion 18, of wood, metal, bakelite, composition or any other desired material, is in the form of a disc or panel having a padded base layer 20 of felt or the like, a raised portion or platform 22, and a foot seat or resting portion 23 on the platform 22.

The base 17, illustrated, is for support on flat-plane surfaces such as provided in store windows and on display stands, and the felt or other pad 20 secured thereto by pasting, or in other suitable manner, is to protect both the base and the support from injury resulting from placing the base on, and removing it from, the support. The pad also compensates for surface irregularities on the base or its support to better seat the base.

The platform 22, forms, with the adjacent top surface of the base, a substantially rabbet groove 24 for a purpose to be hereinafter set forth. The groove 24, designated as a rabbet groove, and having this character about the major portion of the platform 22 also merges into a section 25 which is of substantially channel character, as will appear.

The top-plan contour of the platform 22, in the example given, corresponds to the cross sectional contour of a lady's leg at a position substantially spaced above the knee whereby to telescopically fit a form, as will appear, for supporting a full length full-fashioned stocking in inverted upright position.

The seat 23 is formed to simulate the portions of a lady's high heeled shoe, slipper or sandal below the so called "upper". In this form, with the heel high, and the toe dipped forward, the foot and leg portions of the form, and of a stocking to be placed thereon, are in the shape now generally considered probably the most graceful.

The major portion of the seat 23 is on the platform 22 having the rabbet groove 24 thereabout, but because the length of the foot is greater than the diameter of the thigh normally determined by, or accompanying, the foot, a portion 26 of the seat 23 is provided on the base spaced laterally from the platform 22 whereby to form, with the rabbet groove 24, the channel groove portion 25.

The seat 23 may be divided adjacent to the heel, in a manner similar to the manner in which it is divided adjacent to the toe by the channel groove 25, but by dividing it as indicated, the higher portions of the foot seat 23 adjacent to the heel may be covered by the leg form, when the latter is disposed on the seat in upside-down position, as will appear.

The top surface of the main seat portion 23 is depressed, or molded to the shape of the sole of a lady's foot to a depth comparable to a similar shaping in shoes and slippers, or it may be made deeper than this to, in either case, enable the complementary foot portion of the form to rest naturally and securely in position on the seat, more or less independently of weight balance or unbalance of the form, which are compensated for in different ways, as will appear.

The portion 26 associated with the seat 23 has toe impressions 28, also partially on the main foot seat, which not only lend stability to the form for resting on the base, but also aid in presenting a view of the stocking in its most natural state.

As above set forth, the element or base 17 thus has a plurality of portions or seats of different contour, namely, in this example, the foot seat 23 and the leg seat portion represented by the grooves 24 and 25, which correspond in number to the number of positions in which the article or stocking-receiving element or form may be selectively placed, and which seats are, in effect, superimposed one upon another, are coaxial, or are disposed in the same general location, as they might be if they were on opposite sides of the base, which form is contemplated, so as to conserve the lateral space or top and bottom surface area occupied by the base.

As shown in Figs. 8, 9 and 10, a form 29 simulating a leg and a foot is hollow, and preferably of thin sheet material such as celluloid, aluminum or the like, having a foot portion 30 to fit the seat 23 and its toe portion 26, and a top flange 32 which snugly fits the rabbet groove 24. The form, which is of light weight, rests securely on the base in either of its upright positions, and since in operation it is usually disposed in a shop window or other location where it is not likely to be affected by disturbing air currents or jarring, it will remain in place on the base 17, irrespective of whether it is placed foot end up, with the leg end in direct contact with the base, or leg end up, with the stocking foot between the form and the base. In this form, balance is assisted by the choice of angle between the upper and lower leg, and by the position of the plane of the upper leg end, both of which may be varied in accordance with conditions, and as desired, within limits.

Having the form conform to the natural shape of a lady's foot and leg, including portions fitting the toe impressions 28, does away with the unnatural flattening of the forward sole or toe portion which has been usual in forms of this kind having fixed weight members in the toe portion. In cooperation with the base, the form is a natural form that will stand upright in a freely liftable, or removable, gravity-held position, without the aid of added weight means.

In the form of the invention illustrated in Figs. 1 to 5, inclusive, in which corresponding parts are designated by corresponding reference characters, the base 17 may be substantially identical with the base of Figs. 6 to 10, inclusive, with the exception of the width of the channel groove 25, which is wider to accommodate the thicker walls of a form 29a, and changes which may be made in other dimensions and optionally shaped parts.

The form 29a, for supporting a stocking 34, in addition to having the thicker walls above mentioned, is also preferably constructed of a softer, more pliable material, such as rubber composition, so that, when tinted a natural flesh color, it more nearly approaches the appearance, consistency and feel of the natural leg; this feature not only serving to set off the stocking to advantage but also rendering the device less subject to injury.

Near the top of the form, in its normal position of Figs. 1 and 3, and the bottom of the form, in its inverted position of Fig. 5, a transverse wall 35 is provided, and sloped so as to permit the leg flange 32 to fit the base grooves, and to avoid contact with the foot seat 23. The transverse wall 35 is also so inwardly offset from the adjacent end edge of the form that, in cooperation with the side wall, it forms a hood or cover for enclosing the foot seat 23 when located on the base with the form in inverted position. The arrangement allows a flowable weight mass 37, for varying the distribution of the weight of the device in accordance with any one of a plurality of positions in which the device may be placed, to occupy its substantially lowest position in the inverted position of the article-receiving form shown in Fig. 5; this mass, as shown, being of shot, but obviously possibly being of liquid or other character movable relative to the form in response to movement thereof. The wall 35 has an opening 38, through which the shot 37 may be admitted to, or taken from, the form, and which opening is sealed by a pair of disc or washer-like elements 39, and a screw 40 which clamps the elements 39 to opposite sides of the wall 35 closing the opening 38 and permitting it to be opened as desired.

The weight means 37, which flows in response to movement of the form, not only serves to more forcibly accentuate or stabilize the leg-and-foot form in either upright position but also, by its balancing effect, permits the form to be of thicker walled and more rugged and durable construction.

In the form of the invention of Figs. 11 and 12, both ends of a form 29b, for supporting the stocking 34, have flattened areas to enable the form to sit on a flat-plane surface, with either end of the form in the uppermost position. A body 43 of shot, or other flowable weight means, is provided in such quantity that, in the normal upright position of the form, it occupies only the toe portion.

In a form of this kind, of full size and natural proportions, with only a sufficient mass of the shot 43 in the hollow form to occupy the toe space 42, as indicated, in the inverted position of the form, the shot, for which the hollow form provides a passageway between its ends, would spread out over a larger area at the leg end of the form which is of different contour from the toe portion; or occupy greater space, and be likely to shift position or concentrate the weight at undesired positions. To offset this objection, a closure element 45 for the leg end of the form is provided with a pocket portion 46 which may be of any desired shape and location, but, in the form shown, has inner surfaces so sloped as to concentrate the shot at a desired position. In the form shown, the pocket 46 is shaped to so locate the shot mass toward the rear of the form as to counterbalance the overhanging forward toe portion 42.

In the form of the invention of Figs. 13 and 14, an attachment for a form similar to that of Fig. 12, and taking the place of the leg-end cover 45, provides for adjusting the position of a flowable weight mass 50 by providing a pocket 52 therefor in a dish-shaped member 53. This member is circular in plan contour having an edge portion or flange 54 disposed on a circular flange 55 of a member 56, which has an outer contour conforming to the inner contour of the leg form.

Elements 57 are constituted both as means for holding the member 53 in position on the member 56 and as handles whereby the member 53 may be turned about a longitudinal axis of the leg relative thereto. With the pocket 52 eccentric to this axis, the weight means 50 may be turned thereabout to provide balance adjustment for the device.

Main positions of the weight means 50, in the inverted position of the form, are at opposite sides of the above-mentioned axis with the longitudinal center of the pocket extending through a diameter of the member 53 in the front-to-back median plane of the leg form. Adjustments relative to these general locations may be effected to compensate for inherent discrepancies in the weight balance of the parts, to counteract the forces of elements mounted on the form such as shoes, slippers, sandals, or other items which may be employed to decorate the stocking or to show it more nearly as it appears in actual use, or that may be employed for other purposes; this structure and that of Figs. 11 and 12 providing means for concentrating the weight mass in small volume in a space otherwise of greater volume in which the mass would spread as above stated.

Also, with such device, greater latitude in the shape of the leg form is permitted whereby a greater bend may be effected at the knee, or other adjustments may be effected.

The attachment may be permanently or detachably secured to the form, as by lockable screw and nut devices 58, and the form may initially or later be employed with an open leg end and weight means fixed to the toe portion, or be provided with flowable weight means and a leg-end cover like the cover 45 or of any other desired kind.

The improvements specifically shown and described, by which the above-described results are obtained, may be modified without departing from the spirit and scope of the invention as herein disclosed and claimed.

I claim:

1. A stocking display device comprising a base including a foot seat having a depressed sole-form surface substantially conforming to the sole of a foot, said base also having a leg seat, and a form simulating the foot and a portion of its leg having its sole end portion conforming substantially to said sole-form surface and means at its opposite end for substantially telescopically fitting said second seat over said first seat.

2. A stocking-display device comprising a base including a seat having a depressed surface contour substantially conforming in size and contour to the sole of a normal human foot, and another seat conforming to the cross-sectional contour of a normal human thigh surrounding a portion of the depressed-surface seat but intercepting its forward portion, a leg-and-foot form of natural human shape and dimensions having a foot-end surface in relief substantially conforming to the depressed-surface seat and a leg flange above the knee portion for telescopically fitting the other seat, and weight means in the form flowable through a passageway between a hollow portion adjacent to its foot-end surface and a hollow portion adjacent to the leg-flange.

3. A stocking-display device comprising a base including a foot seat projecting from the base and simulating the sole and heel of a lady's high-heeled shoe having a depressed sole surface, the base having a rabbet-groove leg seat surrounding a portion of the foot seat and cooperating therewith to form a channel groove across the forward portion thereof, a hollow form simulating in size and contour a normal human foot and a leg to a position above the knee having a sole portion in relief substantially conforming to the depressed sole surface and an upper-leg flange for telescopically fitting the leg seat, the hollow form including therein a transverse wall having an opening and disposed in adjacent spaced relation to the leg flange to enclose said projecting foot seat when said upper leg flange is telescopically seated on the leg seat, closure means for the opening, and weight means passable through the opening and flowable in the form between positions adjacent to the ends thereof.

4. A stocking display device comprising a base having in operative position a generally horizontal top surface and an element secured to the base projecting upwardly therefrom in the form of a normally positioned bottom portion of a lady's high-heeled shoe having a generally sloping top surface conforming throughout to the bottom surface of a normal human foot for a slight distance upwardly around the perimeter of the foot impression thus formed, the base having a grooved portion of the irregular cross-sectional contour of a normal human leg above the knee surrounding the rear, and extending through the forward portion, of the element, and a leg form of natural human dimensions and shape including a bottom surface conforming throughout to the top surface of the element and a thigh flange for telescopically fitting the grooved portion.

5. A stocking display device comprising a base having in operative position a generally horizontal top surface and an element secured to the base projecting upwardly therefrom in the form of a normally positioned bottom portion of a lady's high-heeled shoe having a generally sloping top surface conforming throughout to the bottom surface of a normal human foot for a slight distance upwardly around the perimeter of the foot impression thus formed, the base having a grooved portion of the irregular cross-sectional contour of a normal human leg above the knee surrounding the rear, and extending through the forward portion, of the element, a hollow imperforate leg form of natural human dimensions and shape including a bottom surface conforming throughout to the top surface of the element and a thigh flange for telescopically fitting the grooved portion, the leg form having a thigh end wall inwardly from the flange sloping in accordance with the sloping surface, the closure wall being imperforate except for an opening to receive flowable weight means, and closure means for the opening, the interior of the form being shaped to concentrate the weight means in the toe portion when the form is in normal position with its bottom surface fitting the sloping surface and spreading the weight means over the wall when the form is in inverted position with the thigh flange telescopically seated in the grooved portion.

HENRY JANSSEN.